US012767187B2

(12) United States Patent
Ling et al.

(10) Patent No.: US 12,767,187 B2
(45) Date of Patent: Oct. 20, 2026

(54) VEHICLE CONTROL METHOD AND APPARATUS, VEHICLE, AND STORAGE MEDIUM

(71) Applicant: Yinwang Intelligent Technologies Co., Ltd., Shenzhen (CN)

(72) Inventors: Mingze Ling, Shanghai (CN); Wentao Ma, Shenzhen (CN); Yongyou Zhou, Shanghai (CN); Donghao Liu, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/083,578

(22) Filed: Mar. 19, 2025

(65) Prior Publication Data

US 2025/0214630 A1 Jul. 3, 2025

Related U.S. Application Data

(63) Continuation of application No. PCT/CN2022/119912, filed on Sep. 20, 2022.

(51) Int. Cl.
*B60W 60/00* (2020.01)

(52) U.S. Cl.
CPC .... *B60W 60/0053* (2020.02); *B60W 60/0015* (2020.02); *B60W 2520/10* (2013.01);
(Continued)

(58) Field of Classification Search
CPC ......... B60W 60/0053; B60W 2520/26; B60W 2520/28; B60W 30/095; B60W 2510/0661; B60W 2510/1055; B60W 2520/30
See application file for complete search history.

(56) References Cited

U.S. PATENT DOCUMENTS 5,752,211 A * 5/1998 Takasaki ............ B60K 23/0808 701/88
10,124,784 B2 * 11/2018 D'Amato ............... B60W 10/11
(Continued)

FOREIGN PATENT DOCUMENTS

CN 105955248 A 9/2016
CN 106080606 A 11/2016
(Continued)

OTHER PUBLICATIONS

CN 112848915 A (Year: 2021).*

*Primary Examiner* — Roy Rhee
(74) *Attorney, Agent, or Firm* — Conley Rose, P.C.

(57) ABSTRACT

A vehicle control method includes responding to a case in which a vehicle in an automatic driving mode enters an unstable state by determining a second torque change rate based on a first torque change rate obtained when the vehicle enters the unstable state, where the second torque change rate is less than the first torque change rate, and periodically calculating torque of the vehicle based on the second torque change rate using torque obtained when the vehicle enters the unstable state as an initial value, controlling the vehicle by using the calculated torque of the vehicle until the vehicle exits the automatic driving mode, and controlling the vehicle based on torque obtained when the vehicle exits the automatic driving mode.

19 Claims, 5 Drawing Sheets

(52) U.S. Cl.
CPC ..... *B60W 2520/26* (2013.01); *B60W 2520/28* (2013.01); *B60W 2540/10* (2013.01); *B60W 2540/12* (2013.01); *B60W 2540/18* (2013.01); *B60W 2554/80* (2020.02)

(56) References Cited

U.S. PATENT DOCUMENTS

| | | | |
|---|---|---|---|
| 2015/0175009 | A1 | 6/2015 | Beever et al. |
| 2018/0065622 | A1 | 3/2018 | Nishimine et al. |

FOREIGN PATENT DOCUMENTS

| | | | | | |
|---|---|---|---|---|---|
| CN | 111791879 | A | | 10/2020 | |
| CN | 112848915 | A | * | 5/2021 | .............. B60L 15/20 |
| CN | 113467412 | A | | 10/2021 | |
| CN | 114842638 | A | | 8/2022 | |
| JP | 2006035875 | A | | 2/2006 | |
| JP | 2017052489 | A | | 3/2017 | |
| JP | 2019093924 | A | | 6/2019 | |

* cited by examiner

VEHICLE CONTROL METHOD AND APPARATUS, VEHICLE, AND STORAGE MEDIUM

CROSS-REFERENCE TO RELATED APPLICATIONS

This is a continuation of International Patent Application No. PCT/CN2022/119912, filed on Sep. 20, 2022, the disclosure of which is hereby incorporated by reference in its entirety.

TECHNICAL FIELD

This disclosure relates to the field of automobile technologies, and in particular, to a vehicle control method and apparatus, a vehicle, and a storage medium.

BACKGROUND

In weather conditions such as rain, snow, and fog, sensors such as a radar and a camera of a vehicle cannot effectively identify road condition changes. When driving torque or braking torque requested by an automatic driving system (ADS) of the vehicle does not match a road condition and the vehicle keeps running, an antilock brake system (ABS) or a traction control system (TCS) of the vehicle is likely to be activated.

ABS or TCS activation causes the ADS of the vehicle to exit and switch to a manual driving mode. After the ADS exits, driving torque or braking torque is no longer provided. If the driver does not take over the vehicle in time, a traffic accident may occur.

SUMMARY

This disclosure provides a vehicle control method and apparatus, a vehicle, and a storage medium, so that vehicle control is performed by using the control method in this application, thereby improving driving safety of a vehicle.

According to a first aspect, this disclosure provides a vehicle control method. The method includes, in response to a case in which a vehicle in an automatic driving mode enters an unstable state, determining a second torque change rate based on a first torque change rate obtained when the vehicle enters the unstable state, and periodically calculating torque of the vehicle based on the second torque change rate by using torque obtained when the vehicle enters the unstable state as an initial value, controlling the vehicle by using the calculated torque of the vehicle until the vehicle exits the automatic driving mode, and after the exit, controlling the vehicle based on torque obtained when the vehicle exits the automatic driving mode. The second torque change rate is less than the first torque change rate.

In an implementation, the unstable state is a state of the vehicle when neither driving torque nor braking torque of the vehicle matches a road surface condition in a span of time.

In this implementation, when the vehicle enters the unstable state, a torque change rate is reduced, so that a time at which the torque reaches an ABS or a TCS activation threshold is delayed. Therefore, the ABS or TCS activation time is delayed, and an exit time of an ADS is delayed, so that a driver has more time to prepare to take over control of the vehicle. In addition, after the ADS exits, the torque is still provided, and even if the driver does not take over the vehicle in time, no accident occurs. According to the foregoing two aspects, vehicle control is performed by using the control method, so that driving safety of the vehicle can be improved.

In this possible implementation, whether the vehicle enters the unstable state may be determined based on the state of the vehicle. Optionally, the method further includes periodically obtaining status information of the vehicle and determining, based on the status information of the vehicle, whether the vehicle enters the unstable state.

For example, the status information of the vehicle includes at least one piece of the following information vehicle controller information, driver input information, speed information, vehicle environment information, ADS decision information, and feedback information.

In this implementation, whether the vehicle enters the unstable state can be determined only by using the status information of the vehicle. All information required for determining is obtained by using an existing component of the vehicle, and no additional hardware is required, and costs are low.

In a possible implementation, the status information includes the torque of the vehicle, and determining whether the vehicle enters the unstable state includes determining a torque change rate of the vehicle in two adjacent periods based on the periodically obtained torque of the vehicle and determining, based on the torque change rate of the vehicle in the two adjacent periods, whether the vehicle enters the unstable state.

The torque of the vehicle may be either driving torque or braking torque of the vehicle. When the vehicle is in a braking scenario, the braking torque of the vehicle is obtained in this case, and a corresponding torque change rate is a braking torque change rate. When the vehicle is in a driving scenario, the driving torque of the vehicle is obtained in this case, and a corresponding torque change rate is a driving torque change rate. Because principles of control methods in the two scenarios are basically the same, other steps in this application are not separately described, but both the two scenarios are included.

In this implementation, the torque change rate of the vehicle is determined, to determine whether the torque of the vehicle matches the road surface condition, and further determine whether the vehicle enters the unstable state. Therefore, a determining result is accurate.

For example, determining, based on the torque change rate of the vehicle in the two adjacent periods, whether the vehicle enters the unstable state includes determining a minimum distance between the vehicle and an obstacle based on the vehicle environment information, where the minimum distance between the vehicle and the obstacle is a minimum value of distances between the vehicle and obstacles around the vehicle, and when duration in which the second torque change rate is greater than a torque change rate threshold exceeds a first duration threshold, and the minimum distance is greater than a distance threshold, determining that the vehicle enters the unstable state.

In this implementation, the minimum distance between the vehicle and the obstacle is determined. If the minimum distance between the vehicle and the obstacle is excessively short, if the torque change rate is adjusted in this case, collision between the vehicle and the obstacle is likely to occur. In this case, it may be considered that the vehicle does not enter the unstable state, and therefore a control function in this application is not enabled. If the minimum distance between the vehicle and the obstacle exceeds the threshold, and the duration in which the torque change rate is greater than the torque change rate threshold exceeds the first duration threshold, it is considered that the vehicle enters the unstable state. In this case, a safe distance between the vehicle and the obstacle can be ensured, and the ADS can be prevented from exiting prematurely by adjusting the torque change rate.

In another possible implementation, the status information includes a vehicle speed and a wheel speed of the vehicle, and determining whether the vehicle enters the unstable state includes determining a wheel slip rate of the vehicle in each period based on an average vehicle speed and an average wheel speed of the vehicle that are periodically obtained, where the wheel slip rate is a ratio of a difference between the average vehicle speed and the average wheel speed to the average vehicle speed, and determining, based on the wheel slip rate of the vehicle in each period, whether the vehicle enters the unstable state.

In this implementation, the wheel slip rate of the vehicle is determined, to reflect whether the torque of the vehicle matches the road surface condition, and further determine whether the vehicle enters the unstable state. Therefore, a determining result is accurate.

For example, determining, based on the wheel slip rate of the vehicle in each period, whether the vehicle enters the unstable state includes determining a minimum distance between the vehicle and an obstacle based on the vehicle environment information, where the minimum distance between the vehicle and the obstacle is a minimum value of distances between the vehicle and obstacles around the vehicle, and when duration in which the wheel slip rate is greater than a wheel slip rate threshold exceeds a second duration threshold, and the minimum distance is greater than a distance threshold, determining that the vehicle enters the unstable state.

In this implementation, the minimum distance between the vehicle and the obstacle is determined. If the minimum distance between the vehicle and the obstacle is excessively short, if the torque change rate is adjusted in this case, collision between the vehicle and the obstacle is likely to occur. In this case, it may be considered that the vehicle does not enter the unstable state, and therefore a control function in this application is not enabled. However, if the minimum distance between the vehicle and the obstacle exceeds the threshold, and the duration in which the wheel slip rate is greater than the wheel slip rate threshold exceeds the second duration threshold, it is considered that the vehicle enters the unstable state. In this case, a safe distance between the vehicle and the obstacle can be ensured, and the ADS can be prevented from exiting prematurely by adjusting the torque change rate.

In a possible implementation, determining a second torque change rate based on a first torque change rate obtained when the vehicle enters the unstable state includes determining a torque change rate difference based on the first torque change rate obtained when the vehicle enters the unstable state, where a value of the torque change rate difference is positively correlated with a value of the first torque change rate, and determining the second torque change rate based on the first torque change rate and the torque change rate difference.

In this implementation, because the first torque change rate is higher, a time for reaching an ABS or TCS startup threshold may be faster. To avoid this case, a larger torque change rate difference needs to be used for adjustment, a time for starting the ABS or TCS of the vehicle is delayed as much as possible, and a sufficient reaction time is provided for the driver. In addition, because the torque change rate is lower, the vehicle runs more stably.

In another possible implementation, determining a second torque change rate based on a first torque change rate obtained when the vehicle enters the unstable state includes determining a torque change rate difference based on the minimum distance between the vehicle and the obstacle, where the minimum distance between the vehicle and the obstacle is the minimum value of the distances between the vehicle and the obstacles around the vehicle, a value of the torque change rate difference is positively correlated with the minimum distance between the vehicle and the obstacle in the braking scenario, and the value of the torque change rate difference is negatively correlated with the minimum distance between the vehicle and the obstacle in the driving scenario, and determining the second torque change rate based on the first torque change rate and the torque change rate difference.

In the braking scenario, to avoid collision with the obstacle, the braking torque is avoided being adjusted quite much to reduce a speed quite much. In the driving scenario, to avoid collision with the obstacle, the torque change rate is adjusted as much as possible to reduce a vehicle acceleration.

In this implementation, a smaller minimum distance between the vehicle and the obstacle indicates a smaller adjustment of the torque change rate difference. If the torque change rate is adjusted quite high, an accident may be likely to occur. That is, in this solution, on the premise of ensuring safety, a time for starting the ABS or the TCS of the vehicle is delayed as much as possible, to provide a sufficient reaction time for the driver.

For example, the torque change rate difference remains unchanged. For example, only the torque change rate difference and the second torque change rate are calculated, and the second torque change rate is always used subsequently.

For example, the torque change rate difference changes with a change of the minimum distance between the vehicle and the obstacle. For example, the torque change rate difference and the second torque change rate are periodically calculated, and a second torque change rate determined in a previous period is used in each period.

Optionally, the method further includes, in response to the case in which the vehicle in the automatic driving mode enters the unstable state, outputting prompt information, where the prompt information is used to prompt to manually control the vehicle.

In this implementation, the prompt information is output to prompt the driver to prepare for manual driving takeover, so as to avoid a traffic accident caused by untimely takeover, and improve driving safety.

For example, the prompt information may be output by using a panel of the vehicle, and a form includes but is not limited to text prompt information, vibration information, picture prompt information, video prompt information, indicator blinking prompt information, sound prompt information (voice or buzzer), and the like.

Optionally, the method further includes, when a condition is met, stopping controlling the torque of the vehicle, and manually controlling the vehicle. The condition includes that at least one of the following apparatuses detects an input; a vehicle panel button, a brake pedal, a throttle pedal, and a steering wheel.

In this implementation, the vehicle detects a manual takeover instruction or indication, stops the control function in this application, and hands over the control function to manual control.

According to a second aspect, this disclosure provides a vehicle control apparatus. The apparatus includes a determining unit configured to, in response to a case in which a vehicle in an automatic driving mode enters an unstable state, determine a second torque change rate based on a first torque change rate obtained when the vehicle enters the unstable state, where the second torque change rate is less than the first torque change rate, and a control unit, configured to periodically calculate torque of the vehicle based on the second torque change rate by using torque obtained when the vehicle enters the unstable state as an initial value, control the vehicle by using the calculated torque of the vehicle until the vehicle exits the automatic driving mode, and control the vehicle based on torque obtained when the vehicle exits the automatic driving mode.

Optionally, the apparatus further includes an obtaining unit, configured to periodically obtain status information of the vehicle.

The determining unit is further configured to determine, based on the status information of the vehicle, whether the vehicle enters the unstable state.

Optionally, the status information includes the torque of the vehicle, and the determining unit is configured to determine a torque change rate of the vehicle in two adjacent periods based on the periodically obtained torque of the vehicle, and determine, based on the torque change rate of the vehicle in the two adjacent periods, whether the vehicle enters the unstable state.

Optionally, the determining unit is configured to determine a minimum distance between the vehicle and an obstacle based on vehicle environment information, where the minimum distance between the vehicle and the obstacle is a minimum value of distances between the vehicle and obstacles around the vehicle, and when duration in which the second torque change rate is greater than a torque change rate threshold exceeds a first duration threshold, and the minimum distance is greater than a distance threshold, determine that the vehicle enters the unstable state.

Optionally, the status information includes a vehicle speed and a wheel speed of the vehicle, and the determining unit is configured to determine a wheel slip rate of the vehicle in each period based on an average vehicle speed and an average wheel speed of the vehicle that are periodically obtained, where the wheel slip rate is a ratio of a difference between the average vehicle speed and the average wheel speed to the average vehicle speed, and determine, based on the wheel slip rate of the vehicle in each period, whether the vehicle enters the unstable state.

Optionally, the determining unit is configured to determine a minimum distance between the vehicle and an obstacle based on vehicle environment information, where the minimum distance between the vehicle and the obstacle is a minimum value of distances between the vehicle and obstacles around the vehicle, and when duration in which the wheel slip rate is greater than a wheel slip rate threshold exceeds a second duration threshold, and the minimum distance is greater than a distance threshold, determine that the vehicle enters the unstable state.

Optionally, the determining unit is configured to determine a torque change rate difference based on the first torque change rate obtained when the vehicle enters the unstable state, where a value of the torque change rate difference is positively correlated with a value of the first torque change rate, and determine the second torque change rate based on the first torque change rate and the torque change rate difference.

Optionally, the determining unit is configured to determine a torque change rate difference based on the minimum distance between the vehicle and the obstacle, where the minimum distance between the vehicle and the obstacle is the minimum value of the distances between the vehicle and the obstacles around the vehicle, a value of the torque change rate difference is positively correlated with the minimum distance between the vehicle and the obstacle in a braking scenario, and the value of the torque change rate difference is negatively correlated with the minimum distance between the vehicle and the obstacle in a driving scenario, and determine the second torque change rate based on the first torque change rate and the torque change rate difference.

Optionally, the torque change rate difference remains unchanged, or the torque change rate difference changes with a change of the minimum distance between the vehicle and the obstacle.

Optionally, the apparatus further includes an output unit configured to, in response to the case in which the vehicle in the automatic driving mode enters the unstable state, output prompt information, where the prompt information is used to prompt to manually control the vehicle.

Optionally, the control unit is further configured to, when a condition is met, stop controlling the torque of the vehicle, and manually control the vehicle.

The condition includes that at least one of the following apparatuses detects an input, a vehicle panel button, a brake pedal, a throttle pedal, and a steering wheel.

According to a third aspect, this disclosure provides a vehicle. The vehicle includes the vehicle control apparatus according to the second aspect and a vehicle control unit, and the vehicle control apparatus is connected to the vehicle control unit.

According to a fourth aspect, this disclosure provides a vehicle control device. The vehicle control device includes a processor and a memory, the memory is configured to store a software program and a module, and the processor runs or executes the software program and/or the module stored in the memory, so that the vehicle control device implements the method in any possible implementation of the first aspect.

Optionally, there are one or more processors, and there are one or more memories.

Optionally, the memory may be integrated into the processor, or the memory and the processor are separately disposed.

In a specific implementation process, the memory may be a non-transitory memory, such as a read-only memory (ROM). The memory and the processor may be integrated into one chip, or may be respectively disposed on different chips. A type of the memory and a manner of disposing the memory and the processor are not limited in this embodiment.

Optionally, the vehicle control device may be deployed on a public cloud to provide a vehicle control service.

According to a fifth aspect, this disclosure provides a computer program product. The computer program product includes computer program code, and when the computer program code is run by a computer, the computer is enabled to perform the method in any possible implementation of the first aspect.

According to a sixth aspect, this disclosure provides a computer-readable storage medium. The computer-readable storage medium is configured to store program code executed by a processor. The program code is for implementing the method in any possible implementations of the first aspect.

According to a seventh aspect, a chip is provided, and includes a processor. The processor is configured to invoke instructions from a memory, and run the instructions stored in the memory, so that a communication device on which the chip is installed performs the method in any possible implementation of the first aspect.

According to an eighth aspect, another chip is provided, and includes an input interface, an output interface, a processor, and a memory. The input interface, the output interface, the processor, and the memory are connected to each other through an internal connection path. The processor is configured to execute code in the memory. When the code is executed, the processor is configured to perform the method in any possible implementation of the first aspect.

DESCRIPTION OF EMBODIMENTS

To make objectives, technical solutions, and advantages of this application clearer, the following further describes implementations of this application in detail with reference to the accompanying drawings.

To facilitate understanding of the technical solutions provided in embodiments of this application, a system architecture of this application is first described. The technical solutions provided in embodiments of this application may be applied to a plurality of different system architectures. The following describes two system architectures with reference to FIG. 1 and FIG. 2.

Figure 1:
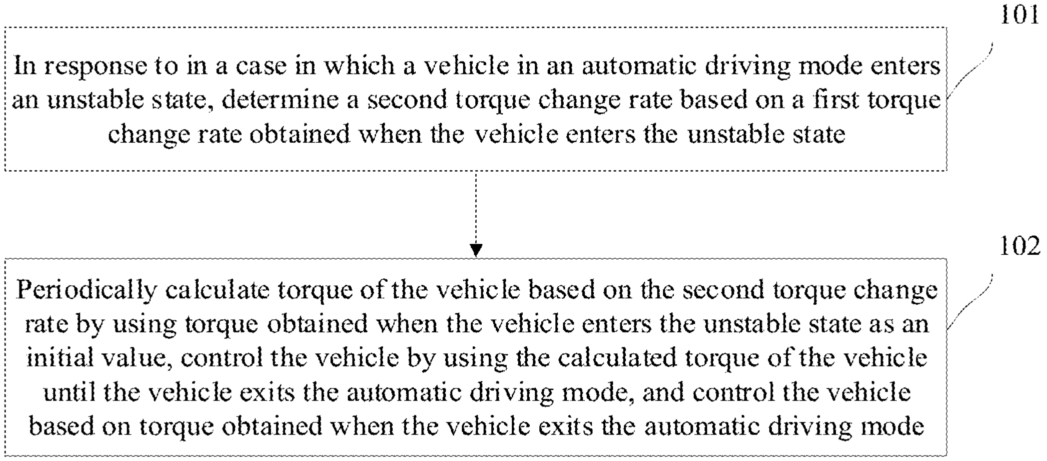
FIG. 1 is a flowchart of a vehicle control method according to an embodiment.

FIG. 1 is a flowchart of a vehicle control method according to an embodiment of this application. The method may be performed by a brake system of a vehicle, such as an integrated brake system (IBS), an electronic stability control system (ESC), and the like. As shown in FIG. 1, the method includes the following steps.

101: In response to in a case in which the vehicle in an automatic driving mode enters an unstable state, determine a second torque change rate abased on a first torque change rate obtained when the vehicle enters the unstable state.

The second torque change rate is less than the first torque change rate.

In this embodiment of this application, the automatic driving mode is a manner in which an automatic driving system of the vehicle controls running of the vehicle.

In this embodiment of this application, the unstable state is a state of the vehicle when neither driving torque nor braking torque of the vehicle matches a road surface condition in a span of time.

102: Periodically calculate torque of the vehicle based on the second torque change rate by using torque obtained when the vehicle enters the unstable state as an initial value, control the vehicle by using the calculated torque of the vehicle until the vehicle exits the automatic driving mode, and control the vehicle based on torque obtained when the vehicle exits the automatic driving mode.

For example, the torque obtained when the vehicle enters the unstable state is A, and the second torque change rate is B. In a first period, torque C is obtained through calculation based on A and B, in a second period, torque D is obtained through calculation based on C and B, in a third period, the torque E is obtained through calculation based on D and B, and the like.

Because the torque of the vehicle always changes based on the second torque change rate, when the torque of the vehicle reaches a torque threshold for activating an ABS or a TCS, the ABS or the TCS is activated, and the ABS of the vehicle exits when the ABS or the TCS is activated.

In this embodiment of this application, when the vehicle enters the unstable state, a torque change rate is reduced, so that a time at which the torque reaches an ABS or TCS activation threshold is delayed. Therefore, an ABS or TCS activation time is delayed, and an exit time of the ADS is delayed, so that a driver has more time to prepare to take over control of the vehicle. In addition, after the ADS exits, the torque is still provided, and even if the driver does not take over the vehicle in time, no accident occurs. According to the foregoing two aspects, vehicle control is performed by using the control method in this application, so that driving safety of the vehicle can be improved.

Figure 2:
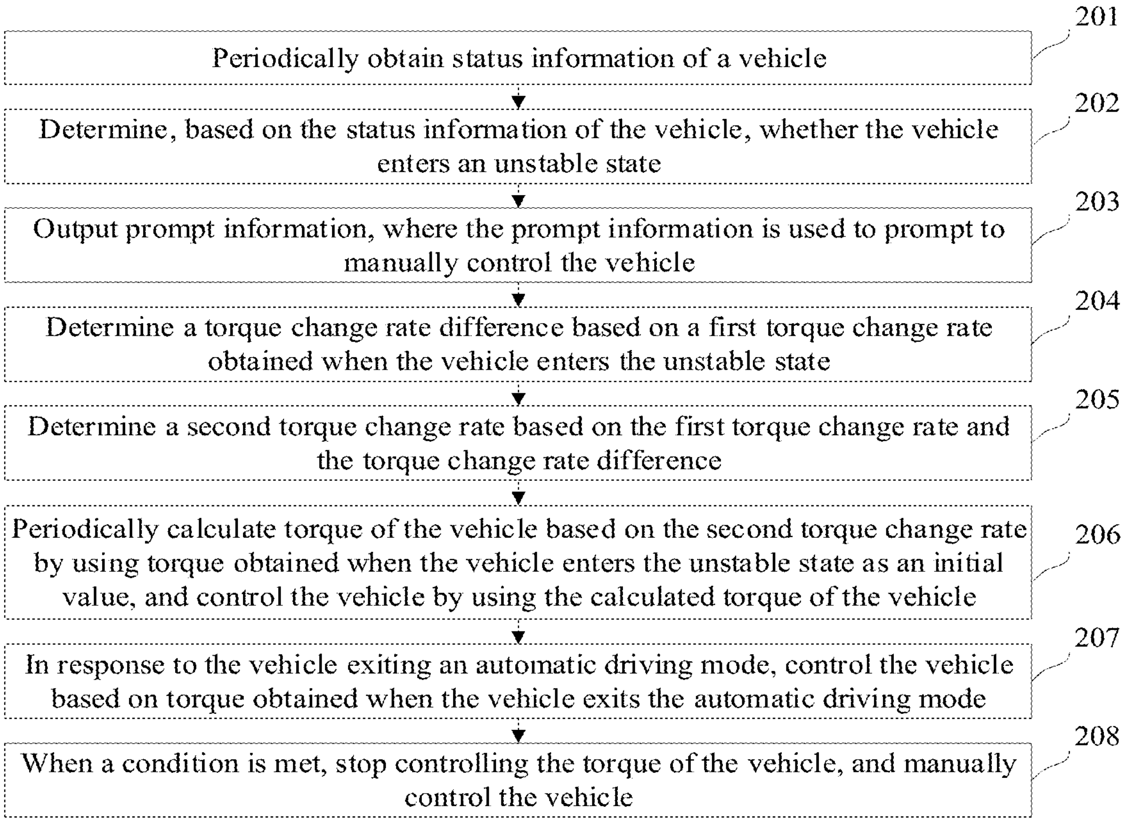
FIG. 2 is a flowchart of a vehicle control method according to an embodiment.

FIG. 2 is a flowchart of a vehicle control method according to an embodiment of this application. The method may be performed by a brake system of a vehicle. As shown in FIG. 2, the method includes the following steps.

201: Periodically obtain status information of the vehicle.

For example, the status information of the vehicle includes at least one piece of the following information; vehicle controller information, driver input information, speed information, vehicle environment information, ADS decision information, and feedback information. The status information is provided by different components. To better apply the status information to the vehicle control method, after the information is received, data fusion may be first performed. Details are not described herein.

The vehicle controller information is information stored in a component such as an ADS, a braking electronic control unit (ECU), or a vehicle control unit (VCU), for example, a status of a previous ignition cycle. A function of the vehicle controller information is to determine whether a related function of the vehicle is faulty, so as to determine whether the step provided in this application can be performed. If a fault occurs based on the vehicle controller information, the step provided in this application is stopped. If no fault occurs based on the vehicle controller information, the step provided in this application is performed.

The driver input information includes input information of components such as a vehicle panel button, a brake pedal, a throttle pedal, and a steering wheel. The vehicle panel button may include a button for controlling enabling of a control function in this application, and may also include a manual driving switching button and the like. The control function in this application is a control function implemented by using the vehicle control method provided in this application.

The speed information includes a wheel speed, a vehicle speed, an acceleration, and the like, which is provided by a sensor module.

The vehicle environment information includes obstacle information, traffic light information, lane line information, zebra crossing information, and the like. The obstacle information includes obstacle distance information. The obstacle may include another vehicle around the vehicle and another type of obstacle. Related information of the another vehicle around the vehicle may be obtained by using a network connection module, and other information is obtained by using an environment awareness module (for example, a radar or a camera light).

The ADS decision information includes a target acceleration/deceleration, target driving/braking torque, and the like, which is provided by the ADS.

The feedback information includes required driving torque, a feedback status of a vehicle actuator, and the like fed back by the VCU, a motor control unit (MCU), and the like, which is provided by an associated ECU.

Figure 3:
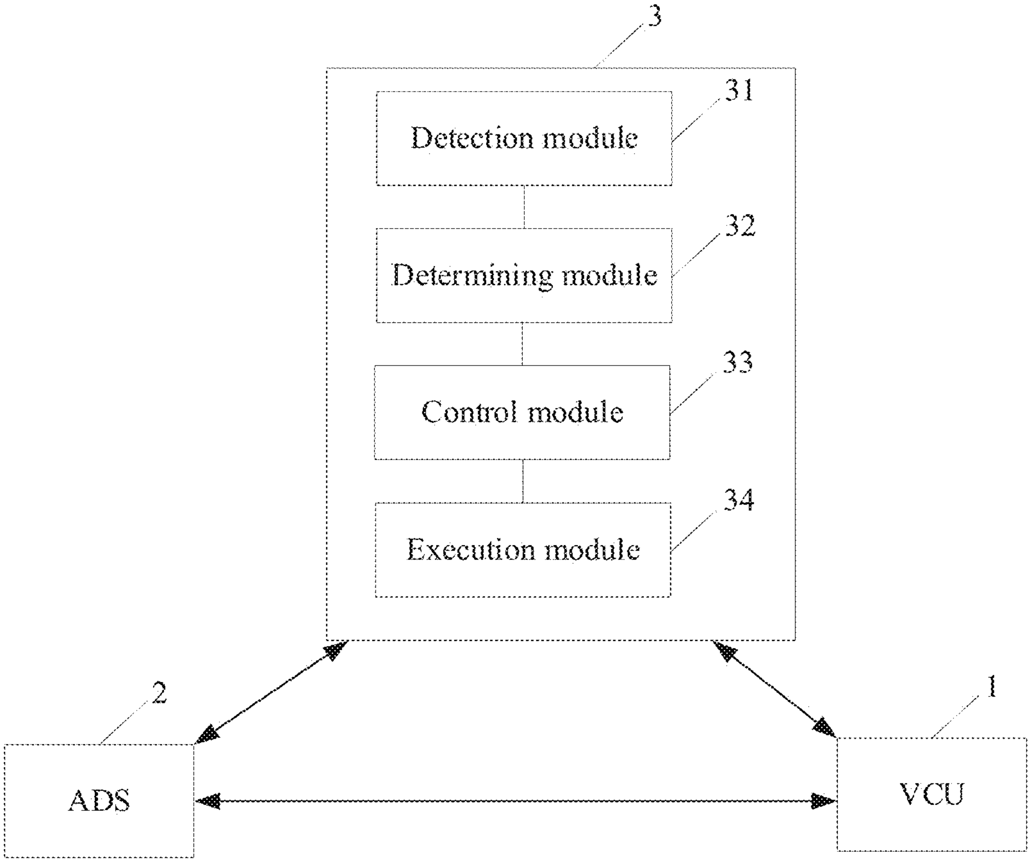
FIG. 3 is a block diagram of a structure of a brake system according to an embodiment.

FIG. 3 is a block diagram of a structure of the brake system according to this embodiment of this application. As shown in FIG. 3, the brake system 3 includes a detection module 31, a determining module 32, a control module 33, and an execution module 34. The detection module is configured to perform step 201, the determining module is configured to perform step 202, the control module is configured to perform steps 203 to 207 (control parts are only implemented in 206 and 207), and the execution module is configured to perform steps 206 to 208 (the execution parts are only implemented in 206 and 207). For example, the foregoing module may be implemented in a form of software.

The control module includes two parts, braking torque control and driving torque control, and may be controlled based on a vehicle running status.

The execution module includes a control unit and a pressure unit (for example, a hydraulic unit). The control unit generates a control instruction based on torque indicated by the control module, and the pressure unit performs an action under instruction control of the control unit. The control unit herein includes but is not limited to a brake ECU, a VCU, an MCU, and the like.

For example, if the braking system is decoupled (for example, integrated braking system 100 (IBS100)), motor pressure closed-loop control or solenoid valve control is directly used, so that the pressure unit works based on an expected pressure. The IBS100 system is used as an example. The system includes eight solenoid valves. After the control function provided in this application works, closed-loop control is performed on a motor and a pipeline pressure sensor, to respond to a target braking force and perform braking control on the entire vehicle. In addition, based on a working condition, the eight solenoid valves can be used to adjust the torque change rate to suppress a rapid torque change. If the braking system is not decoupled, motor pressure closed-loop control or solenoid valve control is required to extract braking fluid from a cylinder to implement a target pressure.

In other words, regardless of whether the braking system is a decoupled braking system or a non-decoupled braking system, the control function provided in this application may be implemented through cooperation between motor pressure closed-loop control and solenoid valve control.

In addition, FIG. 3 further shows a relationship between the braking system 3, an ADS 2, and a VCU 1. The three jointly implement vehicle control by exchanging information, such as driving torque, braking torque, and a feedback status of an interaction request.

202: Determine, based on the status information of the vehicle, whether the vehicle enters the unstable state.

When the vehicle enters the unstable state, steps 203, 204, and subsequent steps are performed, that is, the control function in this application is enabled. Otherwise, steps 203, 204, and the subsequent steps are not performed, that is, the control function in this application is not enabled.

In a possible implementation of this application, the status information includes torque of the vehicle, and determining whether the vehicle enters the unstable state includes determining a torque change rate of the vehicle in two adjacent periods based on the periodically obtained torque of the vehicle, and determining, based on the torque change rate of the vehicle in the two adjacent periods, whether the vehicle enters the unstable state.

The torque of the vehicle may be either driving torque or braking torque of the vehicle. When the vehicle is in a braking scenario, the braking torque of the vehicle is obtained in this case, and a corresponding torque change rate is a braking torque change rate. When the vehicle is in a driving scenario, the driving torque of the vehicle is obtained in this case, and a corresponding torque change rate is a driving torque change rate. Because principles of control methods in the two scenarios are basically the same, other steps in this application are not separately described, but both the two scenarios are included.

In this implementation, the torque change rate of the vehicle is determined, to determine whether the torque of the vehicle matches a road surface condition, and further determine whether the vehicle enters the unstable state.

For example, determining, based on the torque change rate of the vehicle in the two adjacent periods, whether the vehicle enters the unstable state includes determining a minimum distance between the vehicle and an obstacle based on the vehicle environment information, where the minimum distance between the vehicle and the obstacle is a minimum value of distances between the vehicle and obstacles around the vehicle, and when duration in which a second torque change rate is greater than a torque change rate threshold exceeds a first duration threshold, and the minimum distance is greater than a distance threshold, determining that the vehicle enters the unstable state.

In this implementation, the minimum distance between the vehicle and the obstacle is determined. If the minimum distance between the vehicle and the obstacle is excessively short, if the torque change rate is adjusted in this case, collision between the vehicle and the obstacle is likely to occur. In this case, it may be considered that the vehicle does not enter the unstable state, and therefore the control function in this application is not enabled. If the minimum distance between the vehicle and the obstacle exceeds the threshold, and the duration in which the torque change rate is greater than the torque change rate threshold exceeds the first duration threshold, it is considered that the vehicle enters the unstable state. In this case, a safe distance between the vehicle and the obstacle can be ensured, and an ADS can be prevented from exiting prematurely by adjusting the torque change rate.

In this embodiment of this application, the torque change rate threshold, the first duration threshold, and the distance threshold may be selected based on different vehicles, and values of these thresholds may be selected through a plurality of tests. The first duration threshold is used as an example, and an order of magnitude of the first duration threshold is “second”, for example, 3 seconds.

In another possible implementation of this application, the status information includes a vehicle speed and a wheel speed of the vehicle, and determining whether the vehicle enters the unstable state includes determining a wheel slip rate of the vehicle in each period based on the periodically obtained average vehicle speed and average wheel speed of the vehicle, where the wheel slip rate is a ratio of a difference between the average vehicle speed and the average wheel speed to the average vehicle speed, and determining, based on the wheel slip rate of the vehicle in each period, whether the vehicle enters the unstable state.

In this implementation, the wheel slip rate of the vehicle is determined, to determine whether the torque of the vehicle matches the road surface condition, and further determine whether the vehicle enters the unstable state.

For example, determining, based on the wheel slip rate of the vehicle in each period, whether the vehicle enters the unstable state includes determining a minimum distance between the vehicle and an obstacle based on the vehicle environment information, where the minimum distance between the vehicle and the obstacle is a minimum value of distances between the vehicle and obstacles around the vehicle, and when duration in which the wheel slip rate is greater than a wheel slip rate threshold exceeds a second duration threshold, and the minimum distance is greater than a distance threshold, determining that the vehicle enters the unstable state.

In this implementation, the minimum distance between the vehicle and the obstacle is determined. If the minimum distance between the vehicle and the obstacle is excessively short, if the torque change rate is adjusted in this case, collision between the vehicle and the obstacle is likely to occur. In this case, it may be considered that the vehicle does not enter the unstable state, and therefore the control function in this application is not enabled. However, if the minimum distance between the vehicle and the obstacle exceeds the threshold, and the duration in which the wheel slip rate is greater than the wheel slip rate threshold exceeds the second duration threshold, it is considered that the vehicle enters the unstable state. In this case, a safe distance between the vehicle and the obstacle can be ensured, and the ADS can be prevented from exiting prematurely by adjusting the torque change rate.

In this embodiment of this application, the wheel slip rate threshold and the second duration threshold may be selected based on different vehicles, and values of these thresholds may be selected through a plurality of tests. A value of the second duration threshold may be the same as or different from a value of the first duration threshold.

In this embodiment of this application, in addition to the two conditions that both the torque change rate/the wheel slip rate and the minimum distance of the obstacle are met, it is determined that the vehicle enters the unstable state, and subsequent steps are performed.

In addition, it may be further determined, based on the driver input information, for example, that a button for enabling a control function has input and the torque change rate/wheel slip rate condition is met, that the vehicle enters the unstable state. For another example, if the button for enabling the control function has input and the minimum distance condition between the vehicle and the obstacle is met, it is determined that the vehicle enters the unstable state.

In other words, it is determined that the vehicle enters the unstable state provided that any two of the following three conditions are met; the torque change rate/wheel slip rate, the minimum distance from the obstacle, and the button input for enabling the control function.

203: Output prompt information, where the prompt information is used to prompt to manually control the vehicle.

In this implementation, the prompt information is output to prompt a driver to prepare for manual driving takeover, so as to avoid a traffic accident caused by untimely takeover, and improve driving safety.

For example, the prompt information may be output by using a panel of the vehicle, and a form includes but is not limited to text prompt information, vibration information, picture prompt information, video prompt information, indicator blinking prompt information, sound prompt information (voice or buzzer), and the like.

Step 203 is an optional step, and a sequence of step 203 and step 204 is not limited.

204: Determine a torque change rate difference based on a first torque change rate obtained when the vehicle enters the unstable state.

A value of the torque change rate difference is positively correlated with a value of the first torque change rate.

In this implementation, because the first torque change rate is higher, a time for reaching an ABS or TCS startup threshold may be faster. To avoid this case, a larger torque change rate difference needs to be used for adjustment, a time for starting an ABS or TCS of the vehicle is delayed as much as possible, and a sufficient reaction time is provided for the driver. In addition, because the torque change rate is lower, the vehicle runs more stably.

In a possible implementation of this application, a correspondence between the torque change rate difference and the first torque change rate may be determined in advance through an experiment, and the correspondence is stored in the vehicle. When step 204 is performed, the stored correspondence may be searched for.

In another possible implementation of this application, the correspondence between the torque change rate difference and the first torque change rate may be fitted into a curve or a formula. When step 204 is performed, the torque change rate difference corresponding to the first torque change rate is determined by using the curve or the formula.

205: Determine the second torque change rate based on the first torque change rate and the torque change rate difference.

206: Periodically calculate torque of the vehicle based on the second torque change rate by using torque obtained when the vehicle enters the unstable state as an initial value, and control the vehicle by using the calculated torque of the vehicle.

The period for calculating the torque of the vehicle in step 206 may be the same as or different from the period for obtaining the status information of the vehicle in step 201. Values of the foregoing two periods may be designed based on a requirement.

For example, the torque obtained when the vehicle enters the unstable state is A, and the second torque change rate is B. In a first period, torque C is obtained through calculation based on A and B, in a second period, torque D is obtained through calculation based on C and B, in a third period, the torque E is obtained through calculation based on D and B, and the like.

In a possible implementation of this application, the torque change rate difference remains unchanged, that is, torque adjustment is performed based on a straight line with a fixed slope.

In another possible implementation of this application, the torque change rate difference changes with a change of the minimum distance between the vehicle and the obstacle, that is, torque adjustment is performed based on a curve.

In the braking scenario, the braking system indicates the brake ECU to control a braking pressure provided by the hydraulic unit through the calculated torque.

In the driving scenario, the braking system indicates the brake ECU/VCU to request the MCU to control wheel driving torque based on the calculated torque.

207: In response to the vehicle exiting an automatic driving mode, control the vehicle based on torque obtained when the vehicle exits the automatic driving mode.

Because the torque of the vehicle always changes based on the second torque change rate, when the torque of the vehicle reaches a torque threshold for activating an ABS or a TCS, the ABS or the TCS is activated, and the ABS of the vehicle exits when the ABS or the TCS is activated. After the ADS exits, torque is still provided, and even if the driver does not take over the vehicle in time, no accident occurs.

In a possible implementation of this application, the vehicle is controlled by using the torque obtained when the vehicle exits the automatic driving mode.

In another possible implementation of this application, based on the torque obtained when the vehicle exits the automatic driving mode, the torque is appropriately increased or decreased, and the vehicle is controlled by using the increased or decreased torque. Herein, an increased or decreased change amount may be within a set range.

208: When a condition is met, stop controlling the torque of the vehicle, and manually control the vehicle.

The condition includes that at least one of the following apparatuses detects an input, a vehicle panel button, a brake pedal, a throttle pedal, and a steering wheel.

Herein, that the vehicle panel button detects an input means that the driver enters a manual takeover switching instruction by using the vehicle panel button. That the brake pedal detects an input means that a travel change rate of the brake pedal exceeds a threshold and duration exceeds the threshold. That the throttle pedal detects an input means that a travel change rate of the throttle pedal exceeds a threshold and duration exceeds the threshold. That the steering wheel detects an input means that a corner exceeds a threshold and duration exceeds the threshold.

The thresholds in the foregoing implementations may be selected differently based on different vehicles, and values of these thresholds may be selected through a plurality of experiments.

In this step, the vehicle detects a manual takeover instruction or indication, stops the control function in this application and hands over the control function to manual control.

If the condition is always not met, in the braking scenario, the vehicle performs step 207 until the vehicle stops. If the condition is always not met, in the driving scenario, the vehicle stops controlling after performing step 207 for a span of time, and exits the control function provided in this embodiment of this application.

In addition, when the condition is always not met, the vehicle may further periodically output prompt information to repeatedly prompt the driver.

Figure 4:
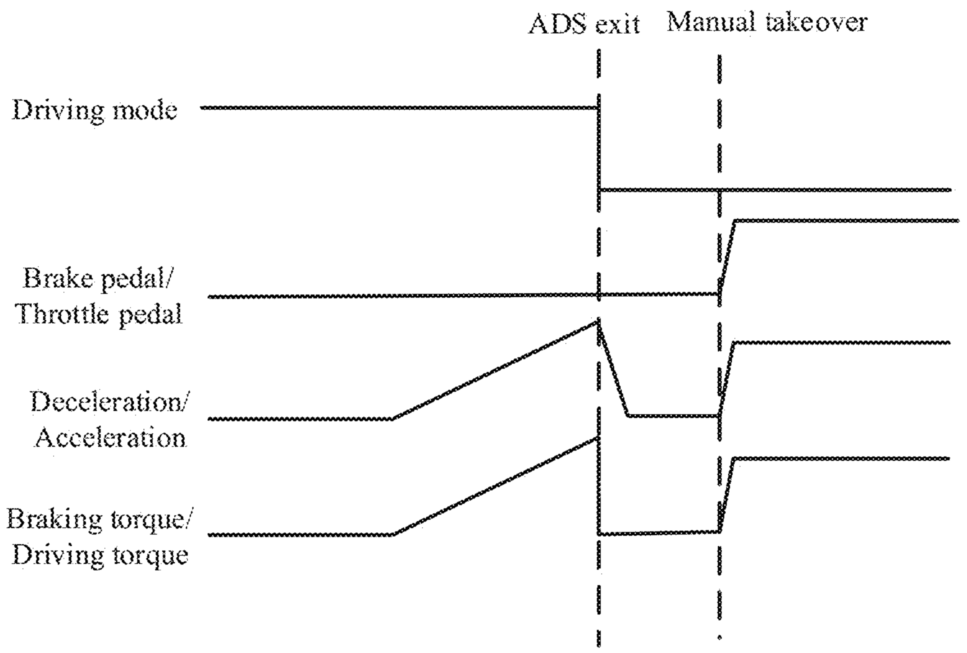
FIG. 4 is a schematic diagram of a control process.

FIG. 4 is a schematic diagram of a control process provided in a related technology. Refer to FIG. 4. When driving torque or braking torque requested by an ADS of the vehicle does not match a road surface condition and the vehicle keeps running, an ABS or TCS of the vehicle is easily activated. In this case, the ADS exits, and the torque requested by the ADS or an acceleration/deceleration is 0, that is, in this case, an ADS request is 0, and a requested pressure acting on the braking system is also 0. A driving mode is an automatic driving mode before the ADS exits, and is a manual driving mode after the ADS exits. In the manual driving mode, when the vehicle is manually taken over, a driver decelerates or accelerates by using a brake pedal or a throttle pedal. However, it can be learned from FIG. 4 that, after the ADS exits, when the driver does not take over the vehicle, a movement of the vehicle is completely unpredictable, and an accident risk is high.

Figure 5:
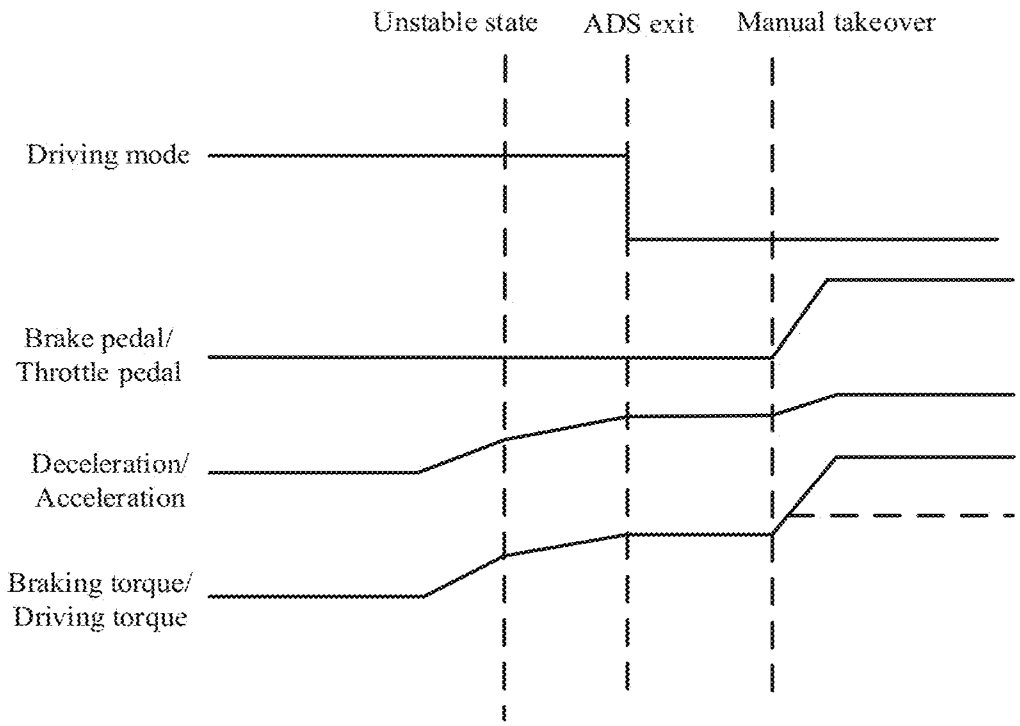
FIG. 5 is a schematic diagram of a control process according to an embodiment.

FIG. 5 is a schematic diagram of a control process according to an embodiment of this application. Refer to FIG. 5. A braking system in this application is provided with three working points, which are respectively corresponding to entering an unstable state, ADS exiting, and manual takeover. Between the first two working points, the braking system adjusts a torque change rate. Between the last two working points, the braking system continues to provide braking or driving torque after the ADS exiting, so that an ABS/TCS state between the ADS exiting and the manual driving takeover does not jump, and an acceleration/deceleration of a vehicle does not change. According to the foregoing two aspects, vehicle control is performed by using the control method in this application, so that driving safety of the vehicle can be improved.

Figure 6:
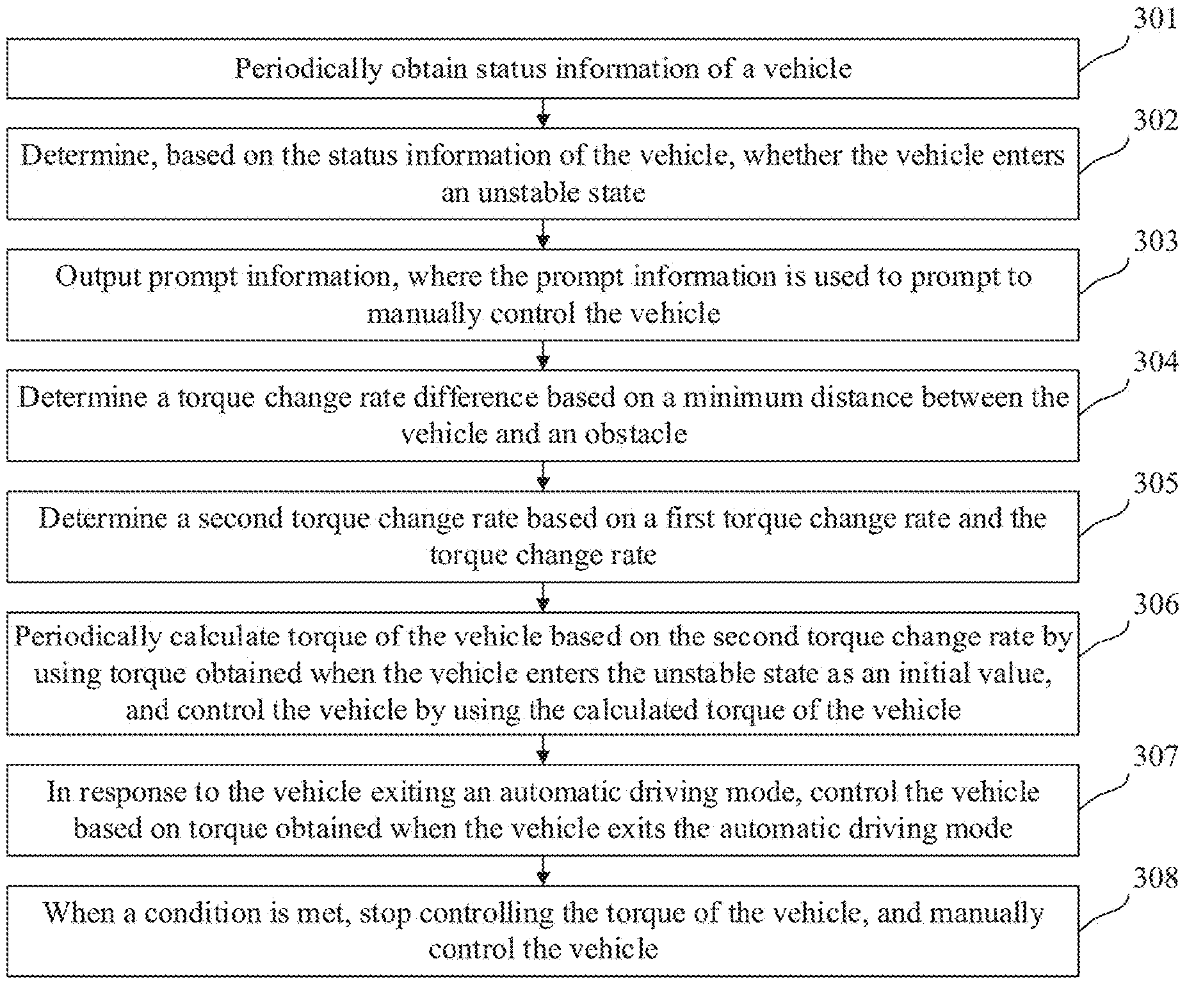
FIG. 6 is a flowchart of a vehicle control method according to an embodiment.

FIG. 6 is a flowchart of a vehicle control method according to an embodiment of this application. The method may be performed by a brake system of a vehicle. As shown in FIG. 6, the method includes the following steps.

301: Periodically obtain status information of the vehicle.

For detailed content of this step, refer to step 201.

302: Determine, based on the status information of the vehicle, whether the vehicle enters an unstable state.

When the vehicle enters the unstable state, step 203 is performed. Otherwise, subsequent steps are not performed.

For detailed content of this step, refer to step 202.

303: Output prompt information, where the prompt information is used to prompt to manually control the vehicle.

Step 303 is an optional step, and a sequence of step 303 and step 304 is not limited.

For detailed content of this step, refer to step 203.

304: Determine a torque change rate difference based on a minimum distance between the vehicle and an obstacle.

In a braking scenario, a value of the torque change rate difference is positively correlated with the minimum distance between the vehicle and the obstacle. In a driving scenario, a value of the torque change rate difference is negatively correlated with the minimum distance between the vehicle and the obstacle.

For example, the torque change rate difference remains unchanged. For example, step 304 and step 305 are performed only once, and a second torque change rate determined in step 305 is always used subsequently.

For example, the torque change rate difference changes with a change of the minimum distance between the vehicle and the obstacle. For example, step 304 and step 305 are periodically performed, and a second torque change rate determined in step 305 in a previous period is used in each period.

A difference between the embodiment provided in FIG. 6 and the embodiment provided in FIG. 2 mainly lies in a difference between step 304 and step 204.

In this implementation, a smaller minimum distance between the vehicle and the obstacle indicates a smaller adjustment of the torque change rate difference. If a torque change rate is adjusted quite high, an accident may be likely to occur. That is, in this solution, on the premise of ensuring safety, a time for starting an ABS or TCS of the vehicle is delayed as much as possible, to provide a sufficient reaction time for a driver.

In a possible implementation of this application, a correspondence between the torque change rate difference and the minimum distance between the vehicle and the obstacle may be determined in advance through an experiment, and the correspondence is stored in the vehicle. When step 304 is performed, the stored correspondence may be searched for.

In another possible implementation of this application, a correspondence between the torque change rate difference and the minimum distance between the vehicle and the obstacle may be fitted into a curve or a formula. When step 204 is performed, the torque change rate difference corresponding to the minimum distance between the vehicle and the obstacle is determined by using the curve or the formula.

305: Determine the second torque change rate based on a first torque change rate and the torque change rate difference.

306: Periodically calculate torque of the vehicle based on the second torque change rate by using torque obtained when the vehicle enters the unstable state as an initial value, and control the vehicle by using the calculated torque of the vehicle.

For detailed content of this step, refer to step 206.

307: In response to the vehicle exiting an automatic driving mode, control the vehicle based on torque obtained when the vehicle exits the automatic driving mode.

For detailed content of this step, refer to step 207.

308: When a condition is met, stop controlling the torque of the vehicle, and manually control the vehicle.

The condition includes that at least one of the following apparatuses detects an input: a vehicle panel button, a brake pedal, a throttle pedal, and a steering wheel.

For detailed content of this step, refer to step 208.

Figure 7:
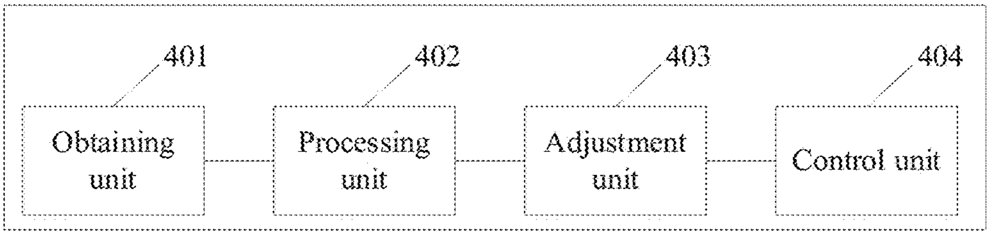
FIG. 7 is a block diagram of a vehicle control apparatus according to an embodiment.

FIG. 7 is a block diagram of a vehicle control apparatus according to an embodiment of this application. The vehicle control apparatus may be implemented as all or a part of a motor control module or a motor controller by using software, hardware, or a combination thereof. The vehicle control apparatus may include a determining unit 401 and a control unit 402.

The determining unit 401 is configured to, in response to a case in which a vehicle in an automatic driving mode enters an unstable state, determine a second torque change rate based on a first torque change rate obtained when the vehicle enters the unstable state. The second torque change rate is less than the first torque change rate.

The control unit 402 is configured to periodically calculate torque of the vehicle based on the second torque change rate by using torque obtained when the vehicle enters the unstable state as an initial value, control the vehicle by using the calculated torque of the vehicle until the vehicle exits the automatic driving mode, and control the vehicle based on torque obtained when the vehicle exits the automatic driving mode.

Optionally, the apparatus further includes an obtaining unit 403, configured to periodically obtain status information of a vehicle.

The determining unit 401 is further configured to determine, based on the status information of the vehicle, whether the vehicle enters the unstable state.

Optionally, the status information includes the torque of the vehicle, and the determining unit 401 is configured to determine a torque change rate of the vehicle in two adjacent periods based on the periodically obtained torque of the vehicle and determine, based on the torque change rate of the vehicle in the two adjacent periods, whether the vehicle enters the unstable state.

Optionally, the determining unit 401 is configured to determine a minimum distance between the vehicle and an obstacle based on vehicle environment information, where the minimum distance between the vehicle and the obstacle is a minimum value of distances between the vehicle and obstacles around the vehicle, and when duration in which the second torque change rate is greater than a torque change rate threshold exceeds a first duration threshold, and the minimum distance is greater than a distance threshold, determine that the vehicle enters the unstable state.

Optionally, the status information includes a vehicle speed and a wheel speed of the vehicle, and the determining unit 401 is configured to determine a wheel slip rate of the vehicle in each period based on an average vehicle speed and an average wheel speed of the vehicle that are periodically obtained, where the wheel slip rate is a ratio of a difference between the average vehicle speed and the average wheel speed to the average vehicle speed and determine, based on the wheel slip rate of the vehicle in each period, whether the vehicle enters the unstable state.

Optionally, the determining unit 401 is configured to determine a minimum distance between the vehicle and an obstacle based on vehicle environment information, where the minimum distance between the vehicle and the obstacle is a minimum value of distances between the vehicle and obstacles around the vehicle, and when duration in which the wheel slip rate is greater than a wheel slip rate threshold exceeds a second duration threshold, and the minimum distance is greater than a distance threshold, determine that the vehicle enters the unstable state.

Optionally, the determining unit 401 is configured to determine a torque change rate difference based on the first torque change rate obtained when the vehicle enters the unstable state, where a value of the torque change rate difference is positively correlated with a value of the first torque change rate, and determine the second torque change rate based on the first torque change rate and the torque change rate difference.

Optionally, the determining unit 401 is configured to determine a torque change rate difference based on the minimum distance between the vehicle and the obstacle, where the minimum distance between the vehicle and the obstacle is the minimum value of the distances between the vehicle and the obstacles around the vehicle, a value of the torque change rate difference is positively correlated with the minimum distance between the vehicle and the obstacle in a braking scenario, and the value of the torque change rate difference is negatively correlated with the minimum distance between the vehicle and the obstacle in a driving scenario, and determine the second torque change rate based on the first torque change rate and the torque change rate difference.

Optionally, the torque change rate difference remains unchanged, or the torque change rate difference changes with a change of the minimum distance between the vehicle and the obstacle.

Optionally, the apparatus further includes an output unit 404, configured to, in response to the case in which the vehicle in the automatic driving mode enters the unstable state, output prompt information, where the prompt information is used to prompt to manually control the vehicle.

Optionally, the control unit 402 is further configured to, when a condition is met, stop controlling the torque of the vehicle, and manually control the vehicle.

The condition includes that at least one of the following apparatuses detects an input; a vehicle panel button, a brake pedal, a throttle pedal, and a steering wheel.

When performing working, the vehicle control apparatus provided in the foregoing embodiment is merely described by using an example of division of the foregoing functional units. During actual application, the foregoing functions can be allocated to different functional units and implemented based on a requirement, that is, an inner structure of the device is divided into different functional units to complete all or some of the functions described above. In addition, the vehicle control apparatus provided in the foregoing embodiment and the vehicle control method embodiment belong to a same conception. For a specific implementation process of the vehicle control apparatus, refer to the method embodiment. Details are not described herein again.

The descriptions of the procedures corresponding to the foregoing accompanying drawings have respective focuses. For a part that is not described in detail in a procedure, refer to related descriptions of another procedure.

An embodiment of this application further provides a vehicle. The vehicle includes the vehicle control apparatus and the vehicle control unit shown in FIG. 6. The vehicle control apparatus is connected to the vehicle control unit.

Figure 8:
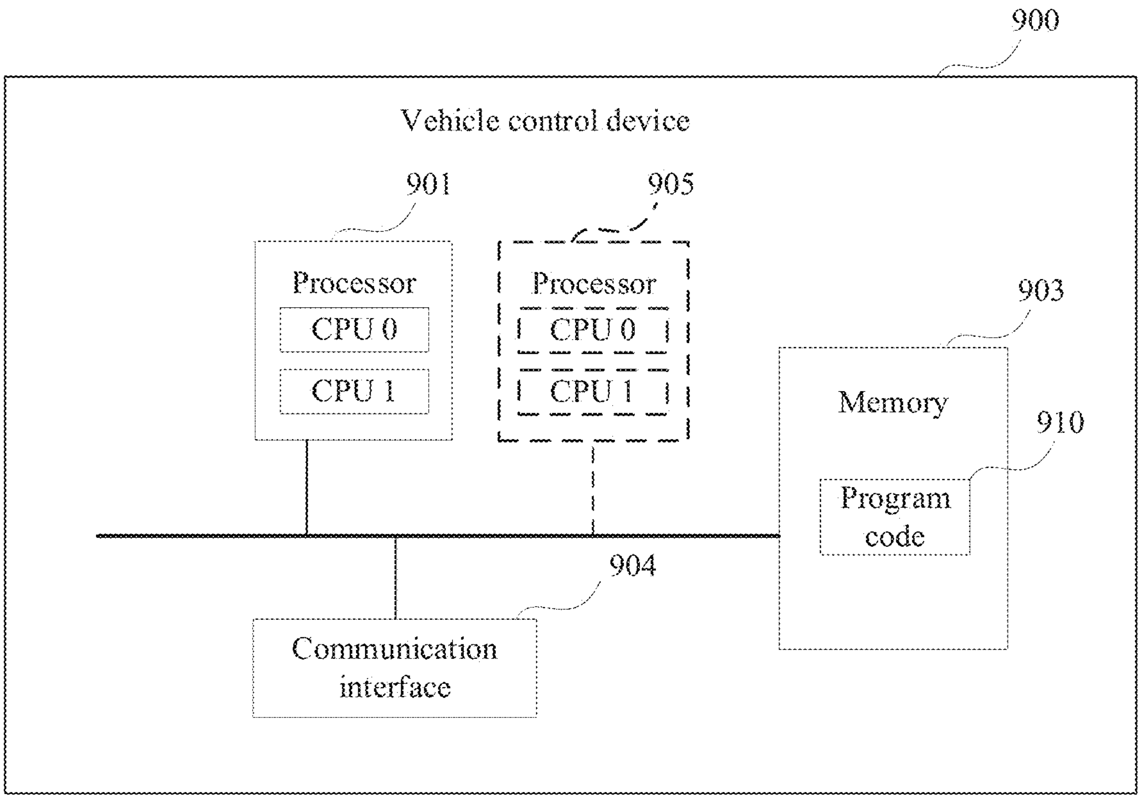
FIG. 8 is a schematic diagram of a structure of a vehicle control device according to an example embodiment.

FIG. 8 is a schematic diagram of a structure of a vehicle control device 900 according to an example embodiment of this application. The vehicle control device 900 shown in FIG. 8 is configured to perform the operations related to the vehicle control method shown in FIG. 1, FIG. 2, or FIG. 6. The vehicle control device 900 may include the brake system of the foregoing vehicle. The vehicle control device 900 may be implemented by using a general bus architecture.

As shown in FIG. 8, the vehicle control device 900 includes at least one processor 901, a memory 903, and at least one communication interface 904.

The processor 901 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 901 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present disclosure. Alternatively, the processor may be a combination of processors implementing a computing function, for example, a combination of one or more microprocessors, or a combination of a DSP and a microprocessor.

Optionally, the vehicle control device 900 further includes a bus. The bus is configured to transmit information between components of the vehicle control device 900. The bus may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 8, but this does not mean that there is only one bus or only one type of bus.

The memory 903 is, for example, a read-only memory (ROM) or another type of static storage device that can store static information and instructions, a random-access memory (RAM) or another type of dynamic storage device that can store information and instructions, or an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer, but is not limited thereto. For example, the memory 903 exists independently, and is connected to the processor 901 through the bus. Alternatively, the memory 903 and the processor 901 may be integrated together.

The communication interface 904 uses any apparatus such as a transceiver, and is configured to communicate with another device or a communication network. The communication network may be an Ethernet, a radio access network (RAN), a BLUETOOTH network, or the like. The communication interface 904 may include a wired communication interface, and may further include a wireless communication interface. In this embodiment of this application, the communication interface 904 may be used by the vehicle control device 900 to communicate with another device.

During specific implementation, in an embodiment, the processor 901 may include one or more CPUs, for example, a CPU 0 and a CPU 1 shown in FIG. 8. Each of these processors may be a single-core processor (single-CPU) or a multi-core processor (multi-CPU). The processor herein may be one or more devices, circuits, and/or processing cores configured to process data (for example, computer program instructions).

During specific implementation, in an embodiment, the vehicle control device 900 may include a plurality of processors, for example, the processor 901 and a processor 905 shown in FIG. 8. Each of these processors may be a single-core processor (single-CPU) or a multi-core processor (multi-CPU). The processor herein may be one or more devices, circuits, and/or processing cores configured to process data (for example, computer program instructions).

During specific implementation, in an embodiment, the vehicle control device 900 may further include an output device and an input device. The output device communicates with the processor 901, and may display information in a plurality of manners. For example, the output device may be a liquid-crystal display (LCD), a light-emitting diode (LED) display device, a cathode-ray tube (CRT) display device, a projector, or the like. The input device communicates with the processor 901, and may receive an input from a user in a plurality of manners. For example, the input device may be a touchscreen device or a sensing device.

In some embodiments, the memory 903 is configured to store program code 910 for executing the solutions of this application, and the processor 901 may execute the program code 910 stored in the memory 903. In other words, the vehicle control device 900 may implement, by using the processor 901 and the program code 910 in the memory 903, the vehicle control method provided in the method embodiment. The program code 910 may include one or more software modules. Optionally, the processor 901 may alternatively store program code or instructions for executing the solutions of this application.

In a specific embodiment, the vehicle control device 900 in this embodiment of this application may be corresponding to the motor control module or the motor controller in the foregoing method embodiments. The processor 901 in the vehicle control device 900 reads instructions in the memory 903, so that the vehicle control device 900 shown in FIG. 8 can perform all or some operations performed by the motor control module or the motor controller.

The processor 901 is configured to, in response to a case in which a vehicle in an automatic driving mode enters an unstable state, determine a second torque change rate based on a first torque change rate obtained when the vehicle enters the unstable state, where the second torque change rate is less than the first torque change rate, and periodically calculate torque of the vehicle based on the second torque change rate by using torque obtained when the vehicle enters the unstable state as an initial value, control the vehicle by using the calculated torque of the vehicle until the vehicle exits the automatic driving mode, and control the vehicle based on torque obtained when the vehicle exits the automatic driving mode.

For brevity, other optional implementations are not described herein again.

The vehicle control device 900 may further correspond to the vehicle control apparatus shown in FIG. 7, and each function module in the vehicle control apparatus is implemented through software of the vehicle control device 900. In other words, the function modules included in the vehicle control apparatus are generated after the processor 901 of the vehicle control device 900 reads the program code 910 stored in the memory 903.

Steps of the vehicle control method shown in FIG. 1, FIG. 2, or FIG. 6 are completed by using an integrated logic circuit of hardware in the processor of the vehicle control device 900 or instructions in a form of software. The steps of the methods disclosed with reference to embodiments of this application may be directly implemented by a hardware processor, or may be implemented by using a combination of hardware in the processor and a software module. The software module may be located in a mature storage medium in the art, such as a RAM, a flash memory, a read-only memory, a programmable read-only memory, an electrically erasable programmable memory, or a register. The storage medium is located in the memory, and the processor reads information in the memory and performs the steps in the foregoing method in combination with the hardware in the processor. To avoid repetition, details are not described herein again.

An embodiment of this application further provides a chip, including an input interface, an output interface, a processor, and a memory. The input interface, the output interface, the processor, and the memory are connected to each other through an internal connection path. The processor is configured to execute code in the memory. When the code is executed, the processor is configured to perform any one of the foregoing vehicle control methods.

It should be understood that the processor may be a CPU, or may be another general-purpose processor, a DSP, an ASIC, an FPGA or another programmable logic device, a discrete gate or a transistor logic device, a discrete hardware component, or the like. The general-purpose processor may be a microprocessor or the like. It should be noted that the processor may be a processor that supports an ARM architecture.

Further, in an optional embodiment, there are one or more processors and one or more memories. Optionally, the memory and the processor may be integrated together, or the memory and the processor are separately disposed. The memory may include a read-only memory and a RAM, and provide instructions and data to the processor. The memory may further include a nonvolatile RAM (NVRAM). For example, the memory may further store a reference block and a target block.

The memory may be a volatile memory or a nonvolatile memory, or may include both a volatile memory and a nonvolatile memory. The nonvolatile memory may be a ROM, a programmable ROM (PROM), an erasable PROM (EPROM), an EEPROM, or a flash memory. The volatile memory may be a RAM, and serves as an external cache. By way of example, and not limitation, many forms of RAMs may be used, for example, a static RAM (SRAM), a dynamic RAM (DRAM), an synchronous DRAM (SDRAM), a double data rate SDRAM (DDR SDRAM), an embedded SDRAM (ESDRAM), a synchronous link DRAM (SLDRAM), and a dual rank RAM (DR RAM).

An embodiment of this application further provides a computer-readable storage medium. The computer-readable storage medium stores computer instructions. When the computer instructions stored in the computer-readable storage medium are executed by a computer device, the computer device is enabled to perform the vehicle control method provided above.

An embodiment of this application further provides a computer program product including instructions. When the computer program product runs on a computer device, the computer device is enabled to perform the vehicle control method provided above.

All or some of the foregoing embodiments may be implemented by software, hardware, firmware, or any combination thereof. When software is used for implementation, all or some of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

obtaining, in response to a vehicle in an automatic driving mode entering an unstable state, a first torque change rate;

determining, based on a minimum distance between the vehicle and an obstacle, a torque change rate difference, wherein a value of the torque change rate difference is positively correlated with the minimum distance in a braking scenario, and wherein the value of the torque change rate difference is negatively correlated with the minimum distance in a driving scenario;

determining a second torque change rate based on the first torque change rate and the torque change rate difference, wherein the second torque change rate is less than the first torque change rate;

periodically calculating, based on the first torque change rate and the second torque change rate, a calculated torque value;

controlling the vehicle using the calculated torque value until the vehicle exits the automatic driving mode;

controlling the vehicle to exit the automatic driving mode;

obtaining, in response to the vehicle exiting the automatic driving mode, a final calculated torque value; and controlling the vehicle based on the final calculated torque value.

2. The method of claim 1, further comprising:

periodically obtaining status information of the vehicle; and determining, based on the status information, whether the vehicle enters the unstable state.

3. The method of claim 2, wherein the status information comprises periodically obtained torque of the vehicle, and wherein determining whether the vehicle enters the unstable state comprises:

determining a torque change rate of the vehicle between two adjacent sampling periods of the periodically obtained torque based on the periodically obtained torque of the vehicle; and determining, based on the torque change rate of the vehicle between the two adjacent sampling periods, whether the vehicle enters the unstable state.

4. The method of claim 3, wherein determining, based on the torque change rate of the vehicle in the two sampling adjacent periods, whether the vehicle enters the unstable state further comprises:

determining, when the second torque change rate is greater than a torque change rate threshold during a first duration and the minimum distance is greater than a distance threshold, that the vehicle enters the unstable state.

5. The method of claim 2, wherein the status information comprises a vehicle speed and a wheel speed of the vehicle, and wherein determining whether the vehicle enters the unstable state comprises:

periodically obtaining an average vehicle speed and an average wheel speed;

determining, based on a difference between the average vehicle speed and the average wheel speed, a wheel slip rate; and determining, based on the wheel slip rate in each period, whether the vehicle enters the unstable state.

6. The method of claim 5, wherein the status information further comprises vehicle environment information, and wherein determining, based on the wheel slip rate of the vehicle in each period, whether the vehicle enters the unstable state further comprises:

determining, when the wheel slip rate is greater than a wheel slip rate threshold during a second duration and the minimum distance is greater than a distance threshold, that the vehicle enters the unstable state.

7. The method of claim 1, wherein the torque change rate difference remains unchanged, or the torque change rate difference changes with a change of the minimum distance between the vehicle and the obstacle.

8. The method of claim 1, further comprising stopping control of the vehicle based on the final calculated torque value and enable manual control of the vehicle in response to detection of at least one input from a vehicle panel button, a brake pedal, a throttle pedal, or a steering wheel.

9. A vehicle control apparatus comprising:

at least one processor; and a memory configured to store instructions that, when executed by the at least one processor, cause the vehicle control apparatus to:

periodically obtain a torque of a vehicle in an automatic driving mode and vehicle environment information;

determine, based on the periodically obtained torque of the vehicle, a first torque change rate and a second torque change rate, wherein the second torque change rate is less than the first torque change rate;

determine, based on the vehicle environment information, a minimum distance between the vehicle and an obstacle;

determine a torque change rate of the vehicle between two adjacent sampling periods of the periodically obtained torque based on the periodically obtained torque of the vehicle;

determine, based on the torque change rate of the vehicle between the two adjacent sampling periods, that the vehicle enters an unstable state when the second torque change rate is greater than a torque change rate threshold during a first duration and when the minimum distance is greater than a distance threshold;

periodically calculate, in response to the vehicle entering the unstable state and based on the first torque change rate and the second torque change rate, a calculated torque value;

control the vehicle using the calculated torque value until the vehicle exits the automatic driving mode;

control the vehicle to exit the automatic driving mode;

obtain, in response to the vehicle exiting the automatic driving mode, a final calculated torque value; and control the vehicle based on the final calculated torque value.

10. The vehicle control apparatus of claim 9, wherein the instructions, when executed by the at least one processor, further cause the vehicle control apparatus to:

periodically obtain an average vehicle speed and an average wheel speed;

determine, based on a difference between the average vehicle speed and the average wheel speed, a wheel slip rate; and further determine that the vehicle enters the unstable state based on the wheel slip rate of the vehicle in each period.

11. The vehicle control apparatus of claim 10, wherein the instructions, when executed by the at least one processor, further cause the vehicle control apparatus to:

periodically obtain vehicle environment information; and further determine that the vehicle enters the unstable state when the wheel slip rate is greater than a wheel slip rate threshold during a second duration, and when the minimum distance is greater than the distance threshold.

12. The vehicle control apparatus of claim 9, wherein the instructions, when executed by the at least one processor, further cause the vehicle control apparatus to determine the second torque change rate by:

determining, based on the first torque change rate, a torque change rate difference, wherein a value of the torque change rate difference is positively correlated with a value of the first torque change rate; and determining, based on the first torque change rate and the torque change rate difference, the second torque change rate.

13. The vehicle control apparatus of claim 9, wherein the instructions, when executed by the at least one processor, further cause the vehicle control apparatus to determine the second torque change rate by:

determining, based on the minimum distance, a torque change rate difference, wherein a value of the torque change rate difference is positively correlated with the minimum distance between the vehicle and the obstacle in a braking scenario, and wherein the value of the torque change rate difference is negatively correlated with the minimum distance between the vehicle and the obstacle in a driving scenario; and determining, based on the first torque change rate and the torque change rate difference, the second torque change rate.

14. The vehicle control apparatus of claim 9, wherein the instructions, when executed by the at least one processor, further cause the vehicle control apparatus to stop controlling the vehicle based on the final calculated torque value and enable manual control of the vehicle in response to detection of at least one input from a vehicle panel button, a brake pedal, a throttle pedal, or a steering wheel.

15. The vehicle control apparatus of claim 13, wherein the torque change rate difference remains unchanged.

16. A computer program product comprising instructions that are stored on a non-transitory medium and that, when executed by one or more processors, cause a vehicle control apparatus to:

periodically obtain a vehicle speed of a vehicle in an automatic driving mode, a wheel speed of the vehicle, an average vehicle speed of the vehicle, an average wheel speed of the vehicle, and vehicle environment information;

obtain a first torque change rate and a second torque change rate, wherein the second torque change rate is less than the first torque change rate;

determine, based on a difference between the average vehicle speed and the average wheel speed, a wheel slip rate;

determine, based on the vehicle environment information, a minimum distance between the vehicle and an obstacle;

determine, based on the wheel slip rate of the vehicle in each period, that the vehicle enters an unstable state when the wheel slip rate is greater than a wheel slip rate threshold during a second duration and when the minimum distance is greater than a distance threshold;

periodically calculate, in response to the vehicle entering the unstable state and based on the first torque change rate and the second torque change rate, a calculated torque value;

execute, in response to the calculated torque value, control of the vehicle until the vehicle exits the automatic driving mode;

exit, in response to the unstable state, the automatic driving mode;

obtain, in response to the vehicle exiting the automatic driving mode, a final calculated torque value; and execute, based on the final calculated torque value, control of the vehicle.

17. The computer program product of claim 16, wherein the instructions, when executed by the one or more processors, further cause the vehicle control apparatus to obtain the second torque change rate by:

determining, based on the minimum distance, a torque change rate difference, wherein a value of the torque change rate difference is positively correlated with the minimum distance in a braking scenario, and wherein the value of the torque change rate difference is negatively correlated with the minimum distance in a driving scenario; and determining, based on the first torque change rate and the torque change rate difference, the second torque change rate.

18. The computer program product of claim 17, wherein the torque change rate difference changes with a change of the minimum distance between the vehicle and the obstacle.

19. The computer program product of claim 16, wherein the instructions, when executed by the one or more processors, further cause the vehicle control apparatus to stop controlling the vehicle based on the final calculated torque value and enable manual control of the vehicle in response to detection of at least one input from a vehicle panel button, a brake pedal, a throttle pedal, or a steering wheel.

* * * * *